United States Patent [19]
Tong

[11] 3,821,213
[45] June 28, 1974

[54] OXIDES OF 10-H-PYRAZINO(2,3-B)(1,4)BENZOTHIAZINE

[75] Inventor: Yulan C. Tong, Walnut Creek, Calif.

[73] Assignee: The Dow Chemical Company, Midland, Mich.

[22] Filed: Oct. 24, 1972

[21] Appl. No.: 299,885

[52] U.S. Cl............................ 260/243 AN, 424/247
[51] Int. Cl.......................................... C07d 93/18
[58] Field of Search.................................... 260/243

[56] References Cited
FOREIGN PATENTS OR APPLICATIONS
1,406,765   6/1965   France............................ 260/243

*Primary Examiner*—Harry I. Moatz
*Attorney, Agent, or Firm*—J. Roger Lochhead

[57] ABSTRACT

Tricyclic pyrazino compounds of the general formula

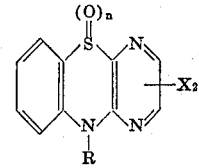

wherein each X is, independently, H, halogen or -OCH$_3$; R is H or an alkyl or aralkyl group; and n is 1 or 2, have been found to be useful as fungicides.

5 Claims, No Drawings

3,821,213

OXIDES OF 10-H-PYRAZINO(2,3-B)(1,4)BENZOTHIAZINE

SUMMARY OF THE INVENTION

This invention is directed to novel oxides of 10-H-Pyrazino(2,3-b)(1,4)benzothiazines of the formula

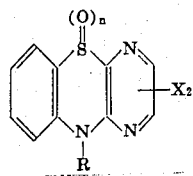

wherein, in the above formula, each X is, independently, H, Cl, Br or -OCH$_3$, preferably H or Cl; R is H, a straight or branched-chain alkyl group of from one to about seven carbon atoms, or an aralkyl group wherein the alkyl portion is linear or branched and contains from one to six carbon atoms, preferably H or benzyl; and n is 1 or 2.

The compounds of this invention are light colored solids. They are only slightly soluble in water, and have limited to moderate solubility in the common organic solids. They have been found to be useful as general purpose fungicides.

DETAILED DESCRIPTION OF THE INVENTION

The tricyclic pyrazino compounds of the present invention are prepared in a sequence of several reactions. A vicinal dihalopyrazine is condensed, in a two-step reaction, with an ortho aminobenzenethiol. For those compounds of the above formulae in which R is H, the ring sulfur is then oxidized to a cyclic sulfoxide or sulfone. When R is other than H, an intervening N-alkylation step is employed before the oxidation is carried out. Also, in some instances a halogen substituent in the pyrazino ring of the condensation product may be replaced by a different halogen or by methoxide after N-alkylation and before S-oxidation. An alternative method of preparing a compound in which R is not H is to employ an orthoamino benzene thiol in which one of the amino hydrogens has been replaced by an alkyl or aralkyl group which is not so bulky as to sterically hinder the requisite ring closure.

CONDENSATION

The condensation reaction can be represented as follows:
(hal is Cl or Br, same in each occurrence)

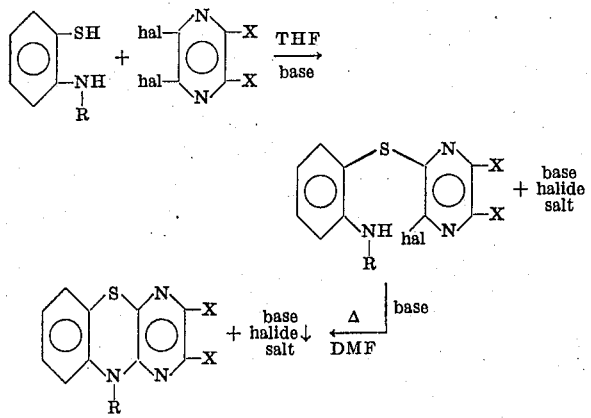

In general, R will be hydrogen in the above formulas.

Equimolar amounts of the reactants are contacted in an inert solvent, at room temperature and in the presence of a tertiary amine, until precipitation of the amine hydrohalide essentially ceases. The liquid phase is separated and carefully evaporated to dryness. The residual intermediate product is mixed with dimethyl formamide and the mixture refluxed (at atmospheric pressure) for from one to two hours. The reaction mixture is then cooled, mixed with ice water and the final condensation product recovered as a solid phase. After being washed with a solvent, such as methanol, this product is generally suitable for the next reaction without recrystallization.

Suitable solvents for the initial step of the condensation are inert liquids in which the reactants are soluble and in which the hydrohalide by-product is preferably insoluble. Ethers, such as tetrahydrofuran (THF) or 1,2-dimethoxyethane (glyme), are preferred. The initial phase of the condensation is carried out at or below room temperature to ensure that undesired side reactions do not occur.

Representative dihalopyrazine reactants which may be employed include 2,3-dichloropyrazine, 2,3-dibromopyrazine, tetrachloropyrazine, tetrabromopyrazine, 2,3-dichloro-5,6-dibromopyrazine and 2-bromo-3-chloro pyrazine.

In addition to 1-amino-2-mercaptobenzene itself, other o-aminobenzenethiol reactants which may be employed in the condensation reaction are N-alkyl- and N-aralkyl-2-mercaptoanilines.

ALKYLATION

The alkylation reaction can be represented as follows: (hal is Cl or Br)

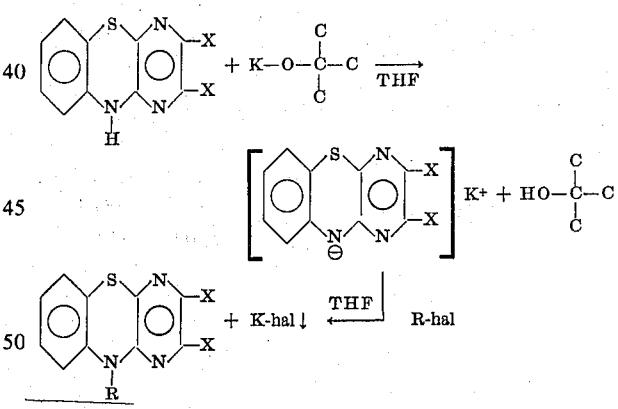

The tricyclic compound is first reacted with potassium t-butoxide in an inert solvent (preferably THF) to form an anion which imparts a characteristic red color to the solution. The alkyl or aralkyl halide is then introduced and the mixture is refluxed (at atmospheric pressure) until the red color disappears. The entire reaction mixture is then diluted with water and extracted with diethyl ether. The alkylation product is recovered from the ethereal extract as an evaporation residue.

Representative alkyl and aralkyl halides suitable as reactants in the alkylation reaction are 2-chloropropane, isobutyl bromide, 4-chloro-2-methylhexane, benzyl bromide, phenethyl chloride and 3-phenyl-2-chloro pentane.

OXIDATION

The oxidation reaction may be represented as follows:

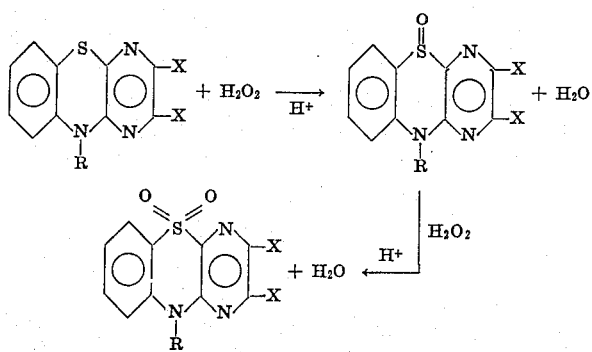

In general, the 5,5-dioxide (sulfone) products result when the tricyclic pyrazino reactant is contacted with 30–35% hydrogen peroxide in an acidic solvent for several hours at a temperature of from about 75° to 80° C. In some instances, higher peroxide concentrations, higher temperatures and/or more prolonged contact are required for further oxidation of the intermediate sulfoxide. Conversely, less severe conditions may be required in some instances where the sulfoxide is the desired product. Acetic acid is generally a satisfactory solvent, but other acids, such as trifluoroacetic, can also be employed. After the oxidation has been carried to the desired stage, the reaction mixture is poured into ice water and the resulting precipitate (product) collected by filtration.

NUCLEOPHILIC DISPLACEMENTS OF -X SUBSTITUENTS

In the preparation of certain compounds of the instant invention, it is necessary to introduce at least one of the -X substituents by nucleophilic displacement of a halogen which was present in the pyrazine starting material. Thus, for example, the final condensation product derived from tetrachloro, tetrabromo or 2,3-dichloro-5,6-dibromo pyrazine will contain two halogen substituents, either or both of which can be replaced by reaction with an alkali metal methoxide. When the two halogens are chlorine, one or both may be replaced with bromine radicals (as by reaction with HBr in glacial acetic acid). Similarly, condensation products derived from trichloro, tribromo or 2,3-dichloro-5-(or-6)-bromopyrazine will have one halo substituent which can be replaced by methoxide. If the long halogen substituent is chlorine, it may be replaced with a bromine.

In those instances where R is H in the condensation product, N-alkylation should be done before nucleophilic displacement reactions are attempted. It is generally difficult to direct formation of desired products from the condensation of 2-mercaptoanilines with vicinal dihalo pyrazines such as trichloro bromo pyrazine. The preparation of vicinal dihalopyrazines, such as 2,3-dihalo-5(or-6)methoxy pyrazines, yields mixed isomers of unknown orientation and of low reactivity. For the several foregoing reasons, both X groups are the same in those compounds of the invention in which R remains as H.

Preferred species include 2,3-dichloro-10H-pyrazino(2,3-b)-(1,4)benzothiazine-5-oxide; 10-benzyl-2,3-dichloro-10H-pyrazino-(2,3-b)(1,4)benzothiazine-5,5-dioxide; and 10-benzyl-10H-pyrazino-(2,3-b)(1,4)benzothiazine-5,5-dioxide.

PREFERRED EMBODIMENTS

I. 2,3-Dichloro-10H-pyrazino(2,3-b)(1,4)benzothiazine-5-oxide

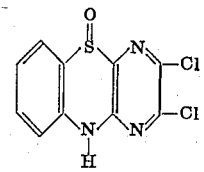

2,3-Dichloro-10H-pyrazino(2,3-b)(1,4)benzothiazine, 16.2 g. (0.06 mole), was mixed with 300 ml. of acetic acid and warmed to 75°–80° C. To this mixture was added 8.7 g. of 35% hydrogen peroxide in 6 minutes, and heating was continued for 2.5 hours. The reaction mixture was then poured into 1.5 kg. of ice-water, stirred and filtered to give 16.6 g. (97%) of product, m.p. 215°–6°. Washing with methanol and chloroform gave a sample with a melting point of 220°–2° C. Structure was confirmed by analysis.

II. 10-Benzyl-2,3-dichloro-10H-pyrazino(2,3-b)(1,4)-benzothiazine-5,5-dioxide

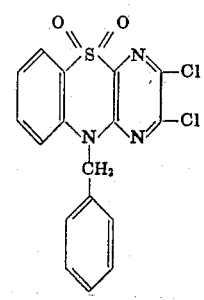

In 60 ml. of tetrahydrofuran (THF) was added 13.5 g. (0.05 mole) of 2,3-dichloro-10H-pyrazino(2,3-b)(1,4)-benzothiazine. To this was added 6.7 g. (0.06 mole) of potassium t-butoxide in 50 ml. of THF. The red solution was heated to boiling under reflux for 15 mins. A solution of 12.0 g. (0.07 mole) of alpha-bromotulene in 40 ml. of THF was added slowly and the whole was heated to boiling under reflux for ½ hr. The red solution turned yellow. The reaction mixture was cooled and poured into a mixture of 150 g. of ice and 100 ml. of ether. The ether was separated and the aqueous layer extracted twice with 100 ml. portions of ether. The etheral solutions were combined, dried and concentrated on a steambath. The dark red residue, on cooling, solidified to give 12.9 g. (72%) of yellow crystalline material. Recrystallization from chloroform-2-propanol gave 10-benzyl-2,3-dichloro-10H-pyrazino(2,3-b)(1,4)-benzothiazine, m.p. 154°–6° C. 13.2 g. (0.037 mole) of this material, in 200 ml. of acetic acid, was oxidized with 17.5 ml. of 35% $H_2O_2$ at 75° to 80° C. for 6 hrs. according to the procedure given in I to give 12.55 g. (87%) of 10-benzyl-2,3-dichloro-10H-pyrazino(2,3-b)-(1,4)benzothiazine-5,5- dioxide, m.p. 230°–2° C. The structure was confirmed by analysis.

III. 10-Benzyl-10H-pyrazino(2,3-b)(1,4)benzothiazine-5,5-dioxide

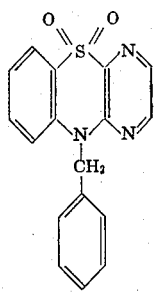

In a flask were placed 18.3 g. (0.123 mole) of 2,3-dichloropyrazine 15.45 g. (0.123 mole) of 2-aminobenzenethiol and 200 ml. of THF. While being maintained at 20°–30° C. with cooling, 13.7 g. (0.135 mole) of triethylamine was added dropwise. After the addition, the cooling bath was removed and the reaction mixture stirred at room temperature for 6 hrs. The triethylamine hydrochloride was removed by filtration and the filtrate concentrated on a steambath. The residue was dissolved in 275 ml. of dimethylformamide (DMF) and heated to boiling under reflux for 1.5 hours. After cooling, the reaction mixture was poured into 1.5 kg. of ice and filtered. The solid was slurried in 600 ml. of methanol and filtered to give 17.25 g. of 10H-pyrazino(2,3-b)(1,4)benzothiazine, m.p. 179°–181° C. Recrystallization from dichloromethane-hexane gave a product with a melting point of 187°–9°.

17.25 g. (0.086 mole) of this product was then alkylated with 21.65 g. (0.127 mole) of alpha-bromotoluene in the presence of 14.3 g. (0.127 mole) of potassium t-butoxide in 120 ml. of THF according to the procedure given in II. After recrystallization from 2-propanol, 13 g. (52%) of 10-benzyl-10H-pyrazino(2,3-b)(1,4)benzothiazine was obtained, m.p. 113°–5°.

Nine grams (0.03 mole) of this product was then oxidized with 8 ml. of 30% $H_2O_2$ in 150 ml. of acetic acid at 75° C. according to the procedure given in I to give 9.5 g. (98%) of 10-benzyl-10H-pyrazino(2,3-b)(1,4benzothiazine-5,5-dioxide, m.p. 175°–7° C.

BIOLOGICAL UTILITY

The tricyclic pyrazino compounds of the present invention are useful as pesticides and have particular utility as fungicides. In such applications the pest to be controlled is contacted with a pesticidal amount of one or more of the compounds of the invention.

For all such uses the present pyrazino compounds can be employed in an unmodified form or they can be dispersed on a finely divided solid and employed as dust or dispersed in water with or without the aid of a surface active agent and the resulting aqueous suspensions employed as drenches or sprays. In other procedures, the products are employed as active constituents in solvent solutions, in oil-in-water or water-in-oil emulsions, or in aqueous dispersions. All such ingredients and adjuvants cooperate with the active component so as to facilitate the invention and obtain an improved and outstanding result.

The foregoing augmented compositions are adapted to be formulated as liquid or solid concentrates and subsequently diluted with additional liquid or solid adjuvants to produce the ultimate treating composition. Suitable emulsifiable liquid concentrates are formulations of the active pyrazino compound in a suitable organic solvent therefor such as alcohols, alkyl ethers of glycols and polyglycols, ketones, aromatics and petroleum distillates, together with an ionic or non-ionic emulsifying agent or a mixture thereof. Such emulsions are preferably designated such that they are self-dispersing with good stability characteristics. The dusts and dust concentrates can be prepared by dispersing the active toxicant compounds in and on a finely divided inert solid support such as diatomaceous earth, bentonite, fuller's earth, attapulgite and similar clays. For the preparation of wettable powders, the solid carrier may be mechanically ground in admixture with the active component hereof and a surface active dispersing agent.

Any of the foregoing compositions can be distributed so as to contact pests with a pesticidal amount of one or more of the active compounds. This amount depends largely upon the manner of distribution, the type of pest being treated and its extent or severity of development and the degree of control desired or required for any particular purpose. Generally, the effective or pesticidal dosage ranges from 1 to 10,000 or more parts of toxicant per million parts of applied composition.

The exact concentration of the active component to be employed in the treating compositions is not critical and may vary considerably.

In representative operations, 2,3-dichloro-10H-pyrazino (2,3-b)benzothiazine-5-oxide is dispersed in warm melted nutrient agar which is then poured into petri dishes allowed to solidify, the aforesaid compound being employed in a number of different amounts to provide from 1 to 500 parts by weight thereof per million parts (ppm) of the ultimate agar composition. The surface of the agar is then inoculated with a variety of fungal pest organisms, and the inoculated plates are incubated under conditions conducive to fungal growth. Similar check plates in which the agar contains no active pyrazino or other toxicant compound are similarly inoculated and incubated. In such operations, 100 percent control is obtained of the organisms *Trichophton mentagrophytes*, *Candida albicans*, *Bacillus subtilis* and *Aspergillin terreus* at a level of 1–10 ppm; of *Staphylococcus aureus* and *Pullularia pullulans* at a level of 1,000 ppm; and of *Canadida albicans* at a level of 500 ppm.

10-Benzyl-2,3-dichloro-10H-pyrazino(2,3-b)(1,4)-benzothiazine-5,5-dioxide gave similar results at the 400–500 ppm concentration level. The 10-benzyl, 5-oxide analog was found to be 95% effective against downey mildew at the 450 ppm level.

I claim:
1. Tricyclic pyrazino compound of the formula

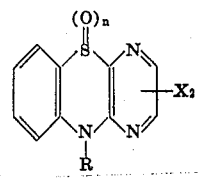

wherein each X is, independently, H, Cl, Br or -OCH$_3$; R is H, a straight or branched-chain alkyl group of from one to about seven carbon atoms, or a phenylalkyl group wherein the alkyl portion is linear or branched and contains from one to six carbon atoms; and n is 1 or 2.

2. A compound of claim 1 wherein X is H or Cl, being the same in each occurrence, and R is hydrogen or a benzyl group.

3. 2,3-Dichloro-10H-pyrazino(2,3-b)(1,4)benzothiazine-5-oxide.

4. 10-Benzyl-2,3-dichloro-10H-pyrazino(2,3-b)(1,4)-benzothiazine-5,5-dioxide.

5. 10-Benzyl-10H-pyrazino(2,3-b)(1,4)benzothiazine-5,5-dioxide.

* * * * *